Aug. 30, 1932.  A. BLONDEL  1,874,430
SYNCHRONIZED REMOTE CONTROL SYSTEM
Filed April 26, 1928  3 Sheets-Sheet 1
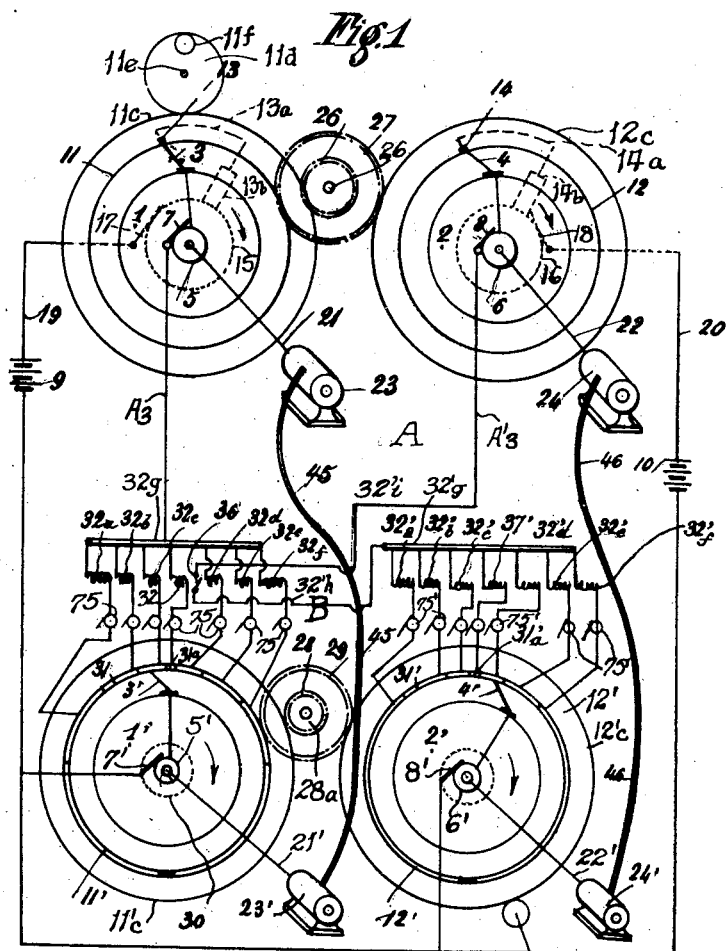
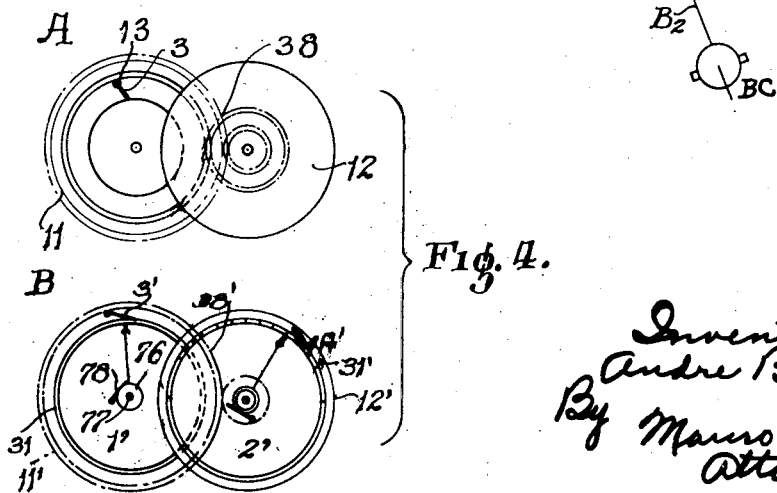

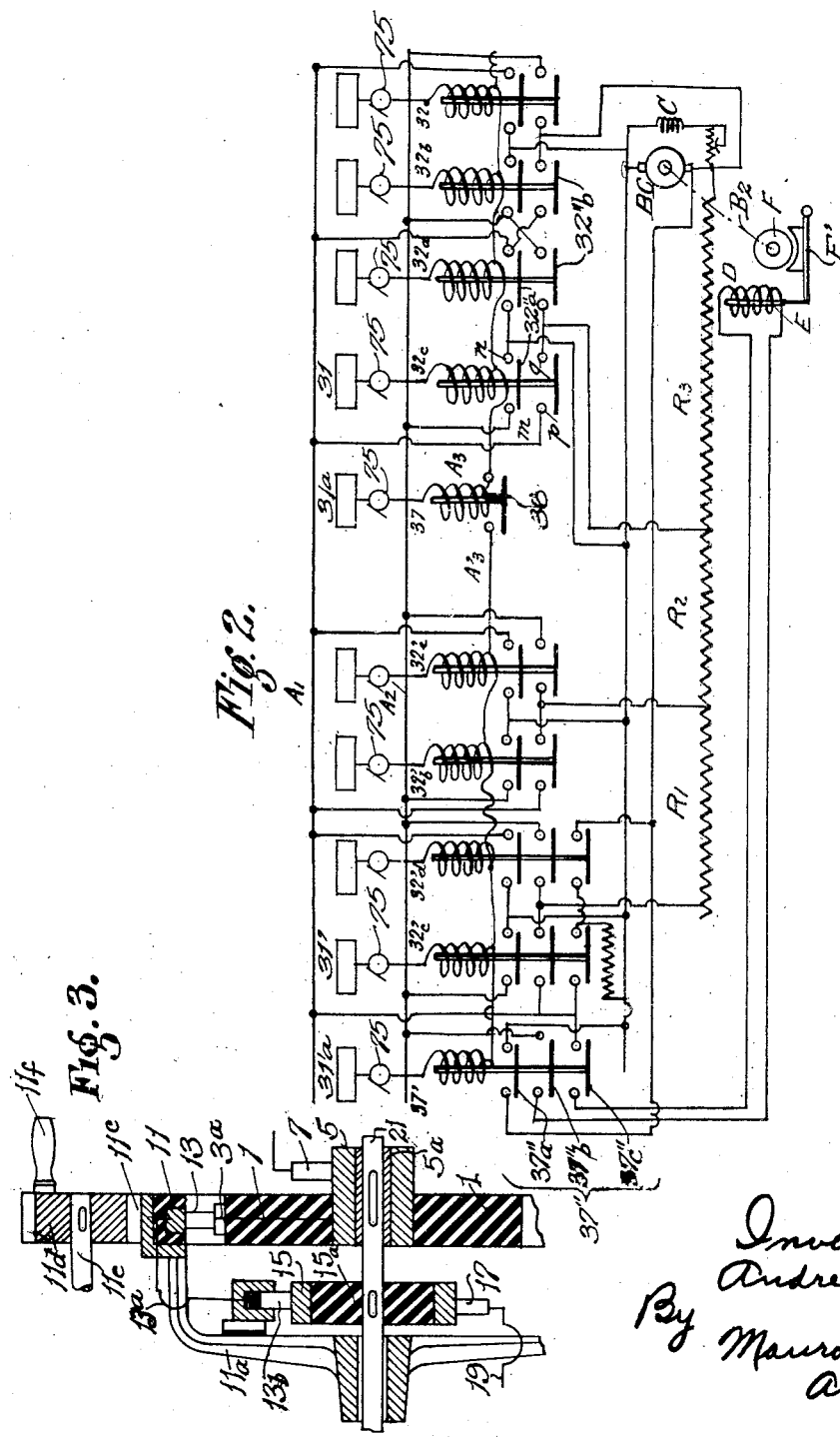

Aug. 30, 1932.   A. BLONDEL   1,874,430
SYNCHRONIZED REMOTE CONTROL SYSTEM
Filed April 26, 1928   3 Sheets-Sheet 3

Inventor:
Andre Blondel,
By Mauro & Lewis
Attorneys.

Patented Aug. 30, 1932

1,874,430

UNITED STATES PATENT OFFICE

ANDRÉ BLONDEL, OF PARIS, FRANCE

SYNCHRONIZED REMOTE CONTROL SYSTEM

Application filed April 26, 1928, Serial No. 273,073, and in France April 27, 1927.

The present invention refers to synchronized remote control systems of the type in which any desired angular displacement of a primary movable object located in a certain place called herein "transmitting station", is to be transmitted by means of a main electric motor to a secondary movable object located together with the said electric motor at a remote distance from the primary object at a place called "receiving station".

The invention has for its object to provide means whereby any angular movements of the said primary object at the transmitting station are reproduced speedily and with great accuracy, either with an equal or with a proportional value, by the said secondary object at the receiving station.

Another object of the invention is to provide means in which the acceleration of a servo-motor controlling the said main remote motor which ensures the angular displacements of the secondary object at the receiving station may be itself progressively controlled.

Again another object of the invention is to allow the use of high intensity currents at the receiving station for actuating accurately and rapidly in synchronism the main motor moving the secondary object, or the servo-motor controlling the said motor at the receiving station in respect of the movements of the primary object at the transmitting station.

Finally another object of the invention is to realize a quick stopping and a reliable blocking of the servo-motor or of the main motor at the receiving station.

The invention will be fully understood by the following description of the same, reference being had to the accompanying drawings.

In these drawings:

Fig. 1 is a diagrammatic illustration of a simplified form of an embodiment of the invention.

Fig. 2 is a diagrammatic detailed view of the connection by means of relays, indicated in a general way in Fig. 1, between the distributing system at the receiving station and a servo-motor also located at said station.

Fig. 3 is a diametrical section through the emitting device illustrated in Fig. 1.

Fig. 4 shows a modification of the embodiment of Fig. 1.

Figs. 1 and 2, taken together, illustrate parts of one system, Fig. 1 represents a general form of realization of the invention and Fig. 2 represents in detail some of the more important parts thereof.

Figures 6, 7:
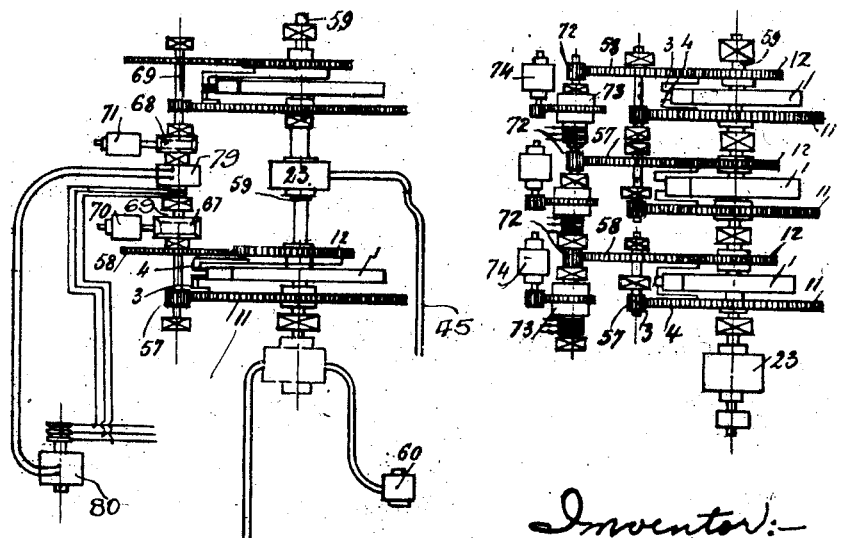
Fig. 6 shows in like manner a modification of the transmitting station.
Fig. 7 shows in like manner another modification of the transmitting station.

What is at present regarded as the preferred embodiment of the invention is that which is illustrated in a general way in Figs. 1, 2 and 3, with specific details illustrated in Fig. 4 and electrical differentials as illustrated in Fig. 7.

As shown in Figs. 1, 2 and 3, the device comprises a transmitting station A and a receiving station B, the latter being located at a point remote from station A.

At station A is a disk 1 made of insulating material rigidly secured on a rotating shaft 21 by means of a ring 5 which is insulated from the shaft 21 by an insulating sleeve $5^a$ (Fig. 3). On the ring 5 rubs a fixed brush 7. Disk 1 carries a brush 3 which is electrically connected to ring 5 by a conductor $3^a$. The said brush 3 rubs against an insulating ring 11 which carries a conducting plot 13. When disk 1 rotates with shaft 21 and ring 5, brush 3 comes once in contact with plot 13 for each turn of disk 1. Plot 13 is electrically connected by a conductor $13^a$ and a brush $13^b$ with a ring 15 keyed on shaft 21 by means of an insulating ring $15a$. Another brush 17 rubs also against ring 15. A ring 11 is loosely mounted on the shaft 21 by means of arms $11a$ (Fig. 3) and it carries an external toothed gearing $11c$ which meshes with a pinion $11^d$ carried by a rotatable axle $11^e$ and provided with a handle $11^f$. Shaft 21 is turned by a motor 23. The toothed gearing $11^c$ on said shaft meshes with a pinion 26 keyed on an axis $26^a$ on which is rigidly secured another pinion 27 meshing with a toothed gearing $12^c$ carried by a ring 12 identical with ring 11. Said ring 12 forms part of a device identical with the one previously described, with the exception of the pinion and handle 11$^d$, 11$^i$, and comprises an insulated plot 14, a brush 4 carried by an insulating disk 2, a conducting ring 6, a fixed brush 8, a shaft 2, a driving motor 24, a conducting disk 16, and brushes 14$^b$ and 18. Motors 23, 24 are of such sort that both disks 1 and 2 rotate constantly at the same speed and in the same direction shown by the arrows on the figure. Both rings 11 and 12 are rotated simultaneously in the same direction, either clockwise or reverse, according to the direction of rotation of the pinion 11$^d$. Brush 17 is connected by a conductor 19 to one terminal of an electric current source 9 and brush 18 is connected by a conductor 20 to one terminal of an electric current source 10.

At the receiving station B an insulating disk 1′ similar to the disk 1 of station A is rigidly mounted on a conducting ring 5′ which is fixed on a rotating shaft 21′. Disk 1′ carries a brush 3′ electrically connected to the ring 5′, and a fixed brush 7′ rubs on said ring 5′. Brush 3′ rubs against conducting insulated segments such at 31, 31$^a$ internally carried by an insulating ring 11′ concentric with disk 1′. Said segments are circumferentially insulated one from the other by a thin layer of insulating material. Ring 11′ carries a peripheral toothed gearing 11′$^c$ which meshes with a pinion 28 keyed on shaft 28$^a$ on which is secured another pinion 29. Each segment 31 is electrically connected by means of a slip ring and brush 75 to the winding, such as 32$^a$, 32$^b$, 32$^c$, 32$^d$, 32$^e$, 32$^f$, of a relay shown in detail in Fig. 2, the circuit connections of said relays being indicated in Fig. 1. The middle segment 31$^a$ is connected to the winding 37 of a special relay also shown in detail in Fig. 2. The other terminals of the windings of all said relays are connected to a bus bar 32$^g$ electrically connected by a conductor $A_3$ to the brush 7 of ring 5. Shaft 21′ is rotated by a constant speed motor 23′ which is synchronized with the rotation of motor 23 above referred to by means of electrical conductors illustrated in the form of a multiple conductor cable 45. The construction of such constant speed motors and the means for feeding and synchronizing them being well known in the art and forming no part of the invention, it is deemed unnecessary to describe them more in detail or to illustrate them in the drawings.

The disk 11′ is connected to the rotating shaft 30 of the object to be moved in synchronism with another object at the transmitting station A, for example with the pinion 11$^d$ or any object rotatably connected thereto. Pinion 29 meshes with a toothed gearing 12′$^c$ carried by a ring 12′ of insulating material similar to ring 11′, said ring 12 being provided with segments such as 31′, 31′$^a$, against which rubs a brush 4′ carried by an insulating disk 2′ rigidly secured to a ring 6′ keyed on a shaft 22′ on which is mounted a constant speed motor 24′, synchronized with the motor 24 by means of a multiple conductor cable 46. Brush 4′ is electrically connected to the ring 6′. A brush 8′ rubs on said ring 6′. Each segment 31′, etc. is connected as illustrated through a slip ring and brush 75′ to one terminal of a winding such as 32′$a$, 32′$b$, etc. Segment 31′$a$ is connected in the same manner to a terminal of the winding 37′ of a relay the detail of which is shown in Fig. 2. The other terminals of all said windings are connected to a bus bar 32′$g$, which in turn is connected through a conductor 32′$h$, a switch 36 and a conductor 32′$i$ through the conductor $A'_3$ to the brush 8 of the transmitting station A.

Ring 12′ is connected to the shaft $B_2$ of a motor BC (see Figs. 1 and 2) which either actuates directly the secondary object above referred to at the receiving station B, or acts as a servo-motor for controlling a motor actuating the said secondary object. Or again motor BC may act as a correcting motor in a synchronized remote transmission as is well known in the art. The inductor of motor BC is shown a C (Fig. 2) and it carries on its shaft $B_2$ a drum F coacting with a brake shoe $F_1$ fixed on a lever connected to the core E of an electro-magnet D. As shown in Fig. 2, the windings of the relays connected to the segments 31, etc... 31$a$ and to segments 31′ etc.... 31′$a$ are disposed in a manner somewhat different from that indicated in Fig. 1, this being done for purpose of simplification; but it is readily seen that this does not change the electrical grouping of the various elements of the device. Said relays are represented as solenoid relays with armatures in the form of cores such as 37″ (left-hand of Fig. 2) each of which acts simultaneously on several contact bars such as 37″$a$, 37″ $b$, 37″$c$ (same place and is arranged in any known manner so as to remain energized over the period that intervenes between successive impulses of electric current which may be directed to the windings of said relays.

Each winding or coil of the 32 or 32′ series is connected at its free end through a wire and one of the individual slip rings 75 to one of the segments 31 or 31′, respectively. The other ends of said coils are connected in parallel respectively to the common conductors $A_3$ or $A'_3$ (of Fig. 1) acting as the bus bars 32$g$ and 32′$g$. For example, the coil 32$c$ is connected on the one hand to conductor $A_3$ which leads to the transmitting station directly, whereas its free end is connected to the contact corresponding to the segment 31 of Fig. 1. At the moment this coil is energized by an impulse of current sent through the rotating contact 31, it attracts its contact bars 32″$a$ and 32″$b$, which establish connections between the contacts $m$ and $n$ on the one hand and $p$ and $q$ on the other hand; and so on as concerns the other relays and their contact bars, it being deemed not necessary to give reference characters to all said cores, bars, contacts and connections, which are clearly illustrated in Fig. 2. The coil 37 near the center of the figure is identical with that which is energized by the central contact $31a$ of the left-hand part of Fig. 1. It serves, as already shown in describing said Fig. 1, to establish the continuity of conductor $A'_3$ of Fig. 2 (corresponding to $32'h$, $32'i$, $A'_3$ on Fig. 1) which serves as a common conductor for the relays of the right part of Fig. 1.

Relay $37'$, which is controlled through the central contact $31'a$ of the ring $12'$, has for its function to close, as shown, a short circuit through its upper contact bars across the armature of the motor BC (which at this moment has no communication with a feeding electric line shown in $A_1$ and $A_2$ for a reason to be later described) and to connect the coil of electro-magnet D to the line $A_1$, $A_2$; which magnet thereupon attracts the core E, causing the brake shoe $F_1$ carried thereby to bear on the drum F and so as to block the motor BC. Said motor is disconnected from the line $A_1$, $A_2$ whenever the relay $37'$ is energized, because the energization of relay $37'$ is conditioned on the energization of relay 37 and the connection of the brushes $3'$—$4'$ with the central segment contacts ($31a$ and $31'a$) during the sending of an impulse of current in the said segments. All the other relays therefore receive no current impulses and remain unenergized.

All said other relays are grouped in pairs, one relay in each pair corresponding to forward motion of the rings $11'$ or $12'$ and consequently of the motor BC and the other relay corresponding to rearward motion of said rings and motor. Each pair of relays has for a function to connect motor BC to the line, with the polarity which corresponds to the desired direction of rotation of the armature thereof, through portions $R_1$, $R_2$, $R_3$ of a comparatively high resistance. Thus as shown, coils $32'c$ and $32'd$ are connected to the total resistance of the rheostat $R_1+R_2+R_3$; coils $32'b$ and $32'e$ are connected to a lower resistance thereof, namely $R_2+R_3$; coils $32c$ and $32d$ are connected only to resistance $R_3$; and coils $32b$ and $32e$ connect directly to the line $A_1$, $A_2$ under full voltage, in one sense or the other, the terminals of the motor BC.

The operation of the device is as follows:

Assuming that the motors 23, 24 and $23'$ rotate at a constant and equally high speed in the direction of the arrows of Fig. 1 (clockwise), and that the ratio of the gearings $11^c$, 26, 27, and $12^c$ on the one hand, and of the gearings $11'c$, 28, 29 and $12'^c$ on the other hand is such that ring 12 makes two revolutions while ring 11 makes one, and $12'$ also makes two revolutions while $11'$ makes one, the disks 1 and 2, $1'$ and $2'$ will rotate at the same constant high speed and an impulse will be sent over the lines $A_3$ and $A'_3$ each time the brushes 3 and 4 make contact respectively with the plots 13 and 14. These impulses will be sent through segments, such as 31 and $31'$, and the corresponding relays, such as $32b$, $32'b$ will be excited.

No current impulses are transmitted to the inductor of the motor BC through the relays, when, at a given time, the rings $11'$ and $12'$ have respectively the same angular position as the rings 11 and 12 and when, at the same time, the brushes $3'$ and $4'$ are respectively on the central segments $31a$ and $31'a$. At this same moment, current is supplied by relay $37'$ to the magnet D in such a way that the motor BC is blocked. If then ring 11 is rotated through a certain angle as by means of pinion $11d$, the contact of brushes 3—4 with their respective contacts 13 and 14 occurs earlier or later than theretofore; the current impulses are consequently produced earlier or later than previously, and they will be sent in one or other of the segments 31 or $31'$, according to the amount of the angular displacement of the plots 13 and 14 of the rings 11 and 12. These current impulses will thus be distributed to one of the relays other than relays 37 and $37'$; which other relay will cause the motor BC to be actuated as the relay $37'$ has been released owing to absence of current impulses and has ceased to energize the magnet D, thus releasing the brake $F_1$.

The greater the angular displacement of ring 11, the farther from the central segments $31a$ or $31'a$ will be those which now receive the current impulses, and the less will be the amount of resistance ($R_1+R_2+R_3$ or $R_2+R_3$ or $R_3$) interposed in the circuit of motor BC. Said motor rotates at a speed corresponding to that of segment 31 or $31'$, which is in the path of the current impulses, and causes the secondary object at the receiving station to rotate around its axis. By this rotation the rings $11'$ and $12'$, mechanically connected to the said secondary object are also caused to rotate, and they do so in such a direction that they return to their initial position for which the current impulses met the segments $31a$ and $31'a$. No more current impulses are then directed to the motor BC. At the same time brake $F_1$ is applied to drum F by magnet D owing to the re-energization of the relay $37'$ so that the motor stops and is held in its stopping position. The rotation of the secondary object is thus also stopped.

When rotating from their initial to their stopping position, rings $11'$ and $12'$ have successively caused the current impulses to be sent to those segments of series 31 and $31'$ which are closer and closer to the central segments 31a and 31'a, and this had the effect of introducing successively greater and greater amounts of resistance into the circuit of the motor, thereby progressively reducing the speed of the latter. The same occurred, but in a reverse direction, when rings 11 and 12 were rotated to follow the displacements of the primary object at the transmitting station. It will readily be seen that these operations take place whatever may be the direction of rotation of rings 11 and 12, and that the motor BC rotates in the same direction the said rings have been rotated.

The first group of rings 11 and 11' and of disks 1 and 1' serves to give approximately (within several degrees for example) to the secondary object to be set at the receiving station B, the position of the primary object at the transmitting station A; the second group of rings 12, 12' and disks 2, 2', driven at an increased speed, serves to improve the result (within several minutes for example) by entering into play when the first ring 11' presents only a slight angular displacement in respect of ring 11. The second ring 12' cannot receive any current so long as the circuit through conductor A'$_3$ which feeds it has not been closed at relay 36 (see Fig. 2) by the special relay 37 controlled by the central segment 31a of the ring 11'. Therefore the manifold disk 2' enters into effective service only in order to perfect the regulation of ring 12 when the first disk 1' is already substantially in angular concordance with the ring 11', and consequently with the shaft 30 of the secondary object to be set at the receiving station.

It is to be noted that the speeds of the shafts 21 and 21' on the one hand, and of 22 and 22' on the other hand, could be different, the speed remaining equal, however, for the two members of each pair of shafts.

In Fig. 4 the rings 11 and 12 at station A and the rings 11' and 12' at station B are respectively connected together by a single pair of gears (38, 38') and hence the direction of the rotation of the second ring in each pair is reversed in respect of the first one. The result remains the same as in the disposition represented in Fig. 1, if the shafts 22 and 22' rotate in opposite directions to the shafts 21 and 21', the order of the relays 32'a, 32'b . . . being further reversed. The relays and other connections between the parts at station A and those at station B are not shown in Fig. 4, as such intermediate parts and connections are, or may be, the same as those shown in Figs. 1 and 2. The ratio of the relative angular displacements of ring 11 towards ring 12 and of ring 11' towards ring 12' in the embodiment of Fig. 4 is different from that illustrated in Fig. 1. The greater this ratio will be chosen the higher will be the accuracy of the setting of the secondary object at the receiving station in respect of the primary one at the transmitting station. A condition to be observed, whatever may be the ratio, is that when the brushes 4' come into contact with the corresponding central segment 31'a the brush 3' is in contact with the central segment 31. Thus any angular rotation of ring 12 and 12' should always be respectively a multiple of an angular rotation of rings 11 and 11'.

The arrangement illustrated in Fig. 4 has the advantage over that of Fig. 1 of presenting less risk of loose play in the gears, and it is particularly suitable for a receiving apparatus, provided that the multiplied synchronized device is given a direction of rotation opposite to that of the synchronized device of the first moving body.

It has been assumed moreover in this figure that rings 11' and 12' carry the brushes 3' and 4' while the moving synchronized devices of high constant speed 1' and 2' carry the contacts 31 and 31', which are in turn connected to rings 76 placed on the shaft 77 from which current is taken off by brushes 78, as represented in connection with one of the contacts in Fig. 4.

Figure 5:
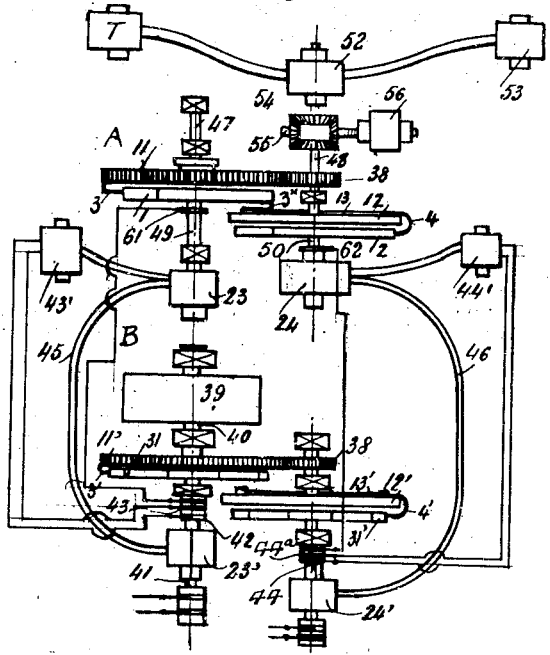
Fig. 5 is a diagrammatic plan view of another embodiment of the invention.

Fig. 5 represents a transmitting station A and a receiving station B, utilizing the disposition of Fig. 4. 39 is the device to be set, whose shaft 40 carries the toothed ring 11'. The latter supports a brush 3'. On an independent shaft 41, located in axial alinement with shaft 40, is mounted a contact drum carrying contacts 31 which are connected to rings 42 provided with brushes 43 fed by the synchronizing current generator 43'.

The same arrangement is provided for the multiplying device, the synchronous motor of which is shown at 24'. Said motor controls a contact drum provided with contacts 31' on which rubs the brush 4' carried by the ring 12'. The contacts 31' are connected on rings 42a to brushes 44 fed by the synchronizing current generator 44'.

45 and 46 represent the cables containing the conductors which establish the synchronizing connections between the motors 23—23' and 24—24'.

The transmitter comprises devices analogous to those of the receiver and chiefly the synchronous motors 23—24, which drive at high speed the movable elements 1 and 2. The rings or controlling devices 11—12 are mounted on independent shafts 47—48 concentric with the shafts 49 and 50 of said movable elements 1—2 and interconnected by gearing 38 as in Fig. 4.

The moving bodies 11—12 are driven by gear trains from a motor 52 which is a synchronous motor synchronized with telecontrol motors T, actuating respectively the primary object at the transmitting station and the secondary object at the receiving station, and with a synchronous generator 53 which controls the said motors.

The speed imparted to the member 11, in the absence of corrections (which are accomplished by other devices such as the differential device 54 referred to below) must be equal to that of element 11' disposed on the shaft 40. If corrections are necessary, they are thus added (in the algebraic sense) to the rotation imparted by the motor 52.

On the shaft leading from motor 52 is disposed a differential device 54 whose planet gears are adapted to be moved by means of a master control motor 56 transmitting the corrections to be established.

The motor 56 is synchronized with the primary controlling object at the control station by any suitable means.

The brushes 3 and 4 transmit the current each to a narrow contact carried respectively by the insulated disks 1 and 2 which are connected by insulated slip rings on the shafts 49—50, which rings are engaged by brushes 61 and 62 from whence lead the lines which connect them to the moving bodies of the receiving station, in accordance with the general diagram of Fig. 1. Said connection is effected through the brushes 43—44, respectively.

Instead of arranging the disks and the rings in the form of concentric drums, as in Fig. 5, I may dispose them in the form of parallel disks. Such an arrangement is shown in Fig. 6, which represents a transmitting station for controlling two receiving devices. For each of these devices, the transmitter consists of a single drum 1 having a narrow contact on which rub two brushes 3 and 4 carried respectively by disks 11 and 12 loosely rotatable on the shaft of the drums 1 and interconnected by gear trains 57 and 58 in such a manner that the speed of one of said disks is stepped up.

The two moving bodies 1 are fixed on the common shaft 59 driven by the motor 23.

The displacement of the two transmission arrangements can be effected by a single motor 79, synchronized with an also synchronized telecontrol motor 80. Said motor 79 is the one that drives, by the gear 57—58, the movable indicators 11—12 in such a manner that the latter can continually send indications of angular displacement to be transmitted, not corrected, through the medium of drums 1 and brushes 3—4 respectively.

Corrections can be added by differentials 67—68 disposed at suitable points in connection with shaft 69. Said differentials 67—68 are adapted to be actuated by small motors 70—71 remotely controlled by means of manually or electro-mechanically maneuvered devices placed at the control station.

The control of the small correction motors 70—71 of the control station may be accomplished by any suitable means such as a Japolsky dephasing system, Siemens motors or analogous expedients.

In each case the number of revolutions to be executed at the control station will be transmitted by the said small correction motors to the corresponding parts of the correction shafts such as 69.

The mechanical differentials above described in connection with Fig. 6 are attended by certain disadvantages, such as the introduction of a great many gears into the transmission system which is likely to cause loose play. These disadvantages may be avoided by replacing said mechanical differentials by electrical differentials, as described below in connection with Fig. 7, that is to say, apparatus comprising a series of motors in which the relative displacement of the phases of the rotor and the stator will be effected either by varying the phases of the feeding current in one or the other of these members, or more simply by turning the stator. This last feature is particularly applicable, and most readily, to synchronous motors of the ordinary type having a direct current inducing field and a polyphase armature. The mechanical differentials having been replaced by motors of this character, the stator thereof may be mounted on bearings or in sliding rings and furnished with collector rings for introducing the corresponding currents, and also with a crown gear for turning the said stator by means of a pinion on a correction motor.

Fig. 7 represents a disposition of this character for the main station and more specifically a disposition for the simultaneous transmission of three sets of corrections.

Referring to said Fig. 7, the synchronous high speed motor 23 is arranged to actuate three synchronizing disks 1, said motor being synchronized with the movable distributing bodies of the receiving motors, as heretofore described.

Said three disks 1 carry the contact elements on which rub brushes 3—4 of the three groups of two devices 11—12 (one group for each receiver).

These six coaxial devices 11—12, loosely mounted with respect to the shaft 59, carry toothed rings which mesh respectively with gear wheels 57, 58, performing the same office as those represented by the same reference characters in Fig. 6.

Wheels 57, 58 are driven by pinions 72, the latter being driven by motors 73 having turnable stators. They therefore run constantly and in synchronism with the apparatus to be set, which is controlled at each receiving station by telecontrol motors, as described in connection with Fig. 6. Moreover, the reduction ratios of the different gear trains inserted between the motors 73 and the three synchronizing disks 1 are so chosen that, in the absence of any correction, there will always be absolute synchronism and coincidence of the zero points of the correcting disks carried by the apparatus to be set and the turning contacts of the synchronizing moving bodies (distributors) of the receiving stations at the moment they receive current from the contacts of the turning moving bodies of the transmitting station. This double condition being fulfilled, the corrections suitably displace the stators of motors 73 for actuating the correcting apparatus of the receiving stations. This result is obtained by turning the stators of the motors 73 by means of correction motors 74 whose pinions mesh with the toothed wheels of the stators of the corresponding motors 73.

As previously described, the control of correction motors 74 is accomplished from the control station by means of master control devices determining suitable angles of rotation of the said correction motors. If the corrections to be made are proportional to each other, the correction motors 74 may be replaced by a single motor actuating a common shaft carrying pinions whose diameters are different (as well as those of the wheels of the stators) and calculated once for all to give suitable proportional corrections.

The embodiment illustrated in Fig. 7 is of general application. It can be applied to a number of different transmission arrangements from a correction station to independent receiving stations. This device is moreover susceptible of numerous modifications either as regards the type of motors to be employed or as regards the location thereof.

From the foregoing it will be obvious that I may vary, as desired, the direction of rotation, either by changing the phase relation of the synchronous motors (if they are polyphase) or by interposing on the shaft of some one of the moving bodies, a mechanical differential whose planet gears are maintained in fixed position.

In the foregoing description it is assumed that the moving bodies to be set are already provided with a master telecontrol. Obviously the correcting devices described are applicable to the complete and direct correction of the position of the moving devices by eliminating the telecontrol apparatus.

For example, in Fig. 7 motors 73 may be eliminated and pinions 72 be driven by the correction motors 74. The same applies to Fig. 6, wherein the motors 23 and 75 could be of any type controlled by ordinary means for bringing the indicators on the desired division.

Having thus described my invention what I claim as new and desire to secure by Letters Patent is:

1. In a synchronizing remote control system having a transmitting station, a plurality of receiving stations each comprising a device to be set from said transmitting station and driven by a telecontrol motor, the combination of, a plurality of synchronized constant speed rotatable elements, 1, 2, 1', 2') at each of said stations, master controlling (11, 12) and controlled (11', 12') elements for said rotatable elements, contact means (3, 13—4, 14) for periodically emitting current impulses of very short duration associated with said transmitting station, distributing means (31, 31a—31', 31'a) for receiving said current at said receiving stations and relay means (32a, 32b—32'a, 32'b) associated with said distributing means for automatically effecting starting, progressive acceleration, electrical and mechanical braking, stopping and reversing of the driving motor of each of said devices to be set.

2. In a synchronizing remote control system having a transmitting station, a plurality of receiving stations each comprising a device to be set from said transmitting station and driven by a telecontrol motor, the combination of, a plurality of synchronized constant speed rotatable elements (1, 2, 1', 2') at each of said stations, master controlling and controlled elements for said rotatable elements, motion multiplying means associated with said rotatable elements and said master controlled and controlling elements, contact means (3, 13, 4, 14) for periodically emitting current impulses of very short duration associated with said transmitting station, distributing means for receiving said current at said receiving stations and relay means associated with said distributing means for automatically effecting starting, progressive acceleration, electrical and mechanical braking, stopping and reversing of the driving motor of each of said devices to be set.

3. In a synchronizing remote control system having a transmitting station, a plurality of receiving stations each comprising a device to be set from said transmitting station and driven by a telecontrol motor, the combination of, a plurality of synchronized constant speed rotatable elements (1, 2, 1', 2') at each of said stations, master controlling and controlled elements for said rotatable elements, motion multiplying means associated with said rotatable elements and said master controlled and controlling elements comprising a plurality of shafts for each of the movable elements of the receiving stations, a shaft for said motion multiplying means controlled by its corresponding receiving element adapted to coincide in direction with said first mentioned shafts, a shaft for the device to be set connected to the said master controlled receiving elements, a second motion multiplying shaft for said device to be set connected to said master controlled receiving elements, contact means for periodically emitting current impulses of very short duration associated with said transmitting station, distributing means (31, 31a—31', 31'a) for receiving said current at said receiving stations and relay means (32a, 32b—32'a, 32'b) associated with said distributing means for automatically effecting starting, accelerating, braking, stopping and reversing of the driving motor of each of said devices to be set.

4. In a synchronizing remote control system having a transmitting station, a plurality of receiving stations each comprising a device to be set from said transmitting station and driven by a telecontrol motor, the combination of, a plurality of synchronized constant speed rotatable elements (1, 2, 1', 2') at each of said stations, master controlling and controlled elements for said rotatable elements, contact means (3, 4, 13, 14, 3', 4') for periodically emitting current impulses of very short duration associated with said transmitting station, distributing means (31, 31a—31', 31'a) for receiving said current at said receiving stations, means for transmitting the relative displacement between said synchronized rotatable elements and said corresponding device to be set to said distributing means and relay means (32a, 32b—32'a, 32'b) associated with said distributing means for automatically effecting starting, accelerating, braking, stopping and reversing of the driving motor of each of said devices to be set.

5. In a synchronized remote control system having a transmitting station and a receiving station, a primary controlling object, a remote object to be set according to the position of the controlling object, a constantly rotating transmitting member at the transmitting station, a constantly rotating receiving member at the receiving station, said constantly rotating members being synchronized, a rotating transmitting contact carried by said rotating transmitting member, a rotating receiving contact carried by said rotating receiving member, a displaceable transmitting contact arranged in the path of the rotary transmitting contact, a displaceable coincidence receiving contact arranged in the path of said rotating receiving contact, a plurality of displaceable receiving contacts distributed in the path of the rotating receiving contact to either side of said coincidence contact, a reproducer of angular movement responsive to movement of said primary controlling object for moving the said displaceable transmitting contact in the path of said rotating transmitting contact, a motor for moving said coincidence contact and displaceable receiving contacts in the path of said rotating receiving contact, means energized in an electrical transmitting circuit between said displaceable receiving contacts and said rotating transmitting contact for energizing said motor in amplitude and direction corresponding to the remoteness and direction of said displaceable receiving contacts from the coincidence contact, means energized in a circuit between said coincidence contact and said rotating transmitting contact for braking the motor, and angular movement responsive means connected to transmit the angular displacement of said coincident and displaceable receiving contacts to said object to be set.

6. A system as claimed in claim 5, in combination with a duplicate higher speed system, the displaceable contacts of the high speed system being each geared in the same ratio to the corresponding contacts of the first system, and the motor controlling means acting in common on the motor of the first system and controlled through a master normally open contact arranged to be closed in response to the energization of the said means energized in the circuit between the coincidence contact of the first system and the rotating transmitting contact of the said first system.

7. A synchronized remote control system comprising a first member rotating at a high constant given speed, a second member rotatably mounted and coaxial with the first member, an insulated plot carried by one of said members and a movable contact piece carried by the other member and engaging said plot each time the first member makes a revolution, so as to cause an electric contact to be established periodically between said first and second members for each revolution of said first member, a third rotatable member mechanically connected to said first member so as to cause said third member to make several full revolutions when said first member makes one full revolution, a fourth member rotating at a high constant speed, a second plot carried by one of said third and fourth members, a movable contact piece carried by the other of said third and fourth members and engaging said second plot so as to cause an electric contact to be established periodically between said third and fourth members for each revolution of the fourth member, a fifth rotatable member carrying circumferential insulated segments, a sixth member rotating at the same high constant speed as the first member, a movable contact carried by said sixth member and engaging with the said segments carried by the fifth member, a seventh rotatable member carrying circumferential insulated segments, means connecting said seventh member to said fifth member so as to cause said seventh member to make as many revolutions for one revolution of said fifth member as said third member makes revolutions for one revolution of said second member, an eighth member rotating at the same high constant speed as said fourth member, a movable contact carried by said eighth member and engaging with the segments of said seventh member, a motor connected to said eighth member and causing an object to be rotated, means for connecting the said object to said eighth member, an electrical relay whose coil is connected at one end to a segment of said fifth member, and at the other end to the contact disposed between the first and second member, a second electric relay similarly connected, a third electric relay connected at one end to one segment of said seventh member and at the other end to the contact disposed between the third and fourth members, a fourth electric relay similarly connected as the previous one, a switch interposed in the circuit of said third and fourth relays and said fourth member, said switch being under the influence of said second relay and being closed when said second relay is energized and opened when it is released, an electric brake located on the shaft of said motor and electrically connected to said fourth relay so as to be applied to said motor when said fourth relay is energized and to be released when no current passes therein, electric connections between said first and third relays and said motor so as to cause said motor to rotate when said first and third relays are energized and to stop when they are not energized, an electromotive force in the circuits comprising the eight members, the movable contacts, the plots and the coils of the delays, and an electric line leading current to the said motor through the said relays.

8. A synchronized remote control system comprising a first member rotating at a high constant given speed, a second member rotatably mounted and coaxial with the first member, an insulated plot carried by one of said members and a movable contact piece carried by the other member and engaging the said plot each time the first member makes a revolution, so as to cause an electric contact to be established periodically between said first and second members for each revolution of the said second member, a third rotatable member mechanically connecting said third member to said second member so as to cause said third member to make several full revolutions when said second member makes one full revolution, a fourth member rotating at a high constant speed, a second plot carried by one of the said third and fourth members, a movable contact piece carried by the other of said third and fourth members and engaging said second plot so as to cause an electric contact to be established periodically between said third and fourth members for each revolution of the fourth member, a fifth rotatable member carrying circumferential insulated segments, a sixth member rotating at the same high constant speed as the first member, a movable contact carried by said sixth member and engaging with said segments carried by the fifth member, a seventh rotatable member carrying circumferential insulated segments, means mechanically connecting said seventh member to said fifth member so as to cause said seventh member to make as many revolutions for one revolution of said fifth member as said third member makes revolutions for one revolution of said second member, an eighth member rotating at the same high constant speed as said fourth member, a movable contact carried by said eighth member and engaging with said segments of said seventh member, a motor connected to the said eighth member and causing an object to be rotated, means for mechanically connecting said object to said seventh member, an electrical relay whose coil is connected at one end to a segment of said fifth member, and at the other end to the contact disposed between the first and the second member, a second electric relay similarly connected, a third electric relay connected at one end to one segment of the said seventh member and at the other end to the contact disposed between the third and fourth members, a fourth electric relay similarly connected as the previous one, a switch interposed in the circuit of the said third and fourth relays and said fourth member, said switch being under the influence of said second relay and being closed when said second relay is energized and opened when said second relay is released, an electric brake located on the shaft of said motor and electrically connected to said fourth relay so as to be applied to the said motor when said fourth relay is energized and to be released when no current passes in the said fourth relay, electric connections between said first and third relays and said motor so as to cause the motor to rotate when the said first and third relays are energized and to stop when the said first and third relays are not energized, an electromotive force in the respective circuits comprising the eight members, the movable contacts, the plots and the coils of the relays, an electric line leading current to the said motor through the said relays, and means for rotating the second said member.

In testimony whereof I have affixed my signature.

ANDRÉ BLONDEL.